United States Patent
Kawashima et al.

(10) Patent No.: US 10,707,494 B2
(45) Date of Patent: Jul. 7, 2020

(54) GAS DIFFUSION LAYER FOR FUEL CELL, METHOD FOR MANUFACTURING SAID LAYER, MEMBRANE-ELECTRODE ASSEMBLY, AND FUEL CELL

(71) Applicant: Panasonic Intellectual Property Management Co., Ltd., Osaka (JP)

(72) Inventors: Tsutomu Kawashima, Nara (JP); Keiichi Kondou, Hyogo (JP); Masashi Shoji, Kyoto (JP); Koji Ogawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 170 days.

(21) Appl. No.: 15/767,303

(22) PCT Filed: Oct. 21, 2016

(86) PCT No.: PCT/JP2016/004651
§ 371 (c)(1),
(2) Date: Apr. 10, 2018

(87) PCT Pub. No.: WO2017/085901
PCT Pub. Date: May 26, 2017

(65) Prior Publication Data
US 2018/0301711 A1     Oct. 18, 2018

(30) Foreign Application Priority Data

Nov. 19, 2015 (JP) ................. 2015-226169

(51) Int. Cl.
*H01M 4/86* (2006.01)
*H01M 4/88* (2006.01)
(Continued)

(52) U.S. Cl.
CPC .......... *H01M 4/8626* (2013.01); *H01M 4/88* (2013.01); *H01M 4/8807* (2013.01); *H01M 4/96* (2013.01);
(Continued)

(58) Field of Classification Search
CPC .... H01M 4/8626; H01M 4/88; H01M 4/8807; H01M 4/96; H01M 8/02; H01M 8/1004;
(Continued)

(56) References Cited

U.S. PATENT DOCUMENTS 4,038,463 A * 7/1977 Lamarine ............... H01M 4/86
429/529
5,861,222 A   1/1999 Fischer et al.
(Continued)

FOREIGN PATENT DOCUMENTS

JP   2003-187809   7/2003
JP   2003-197202   7/2003
(Continued)

OTHER PUBLICATIONS

Machine translation of JP 2006-294559 (no date).*
(Continued)

*Primary Examiner* — Amanda C. Walke
(74) *Attorney, Agent, or Firm* — Wenderoth, Lind & Ponack, L.L.P.

(57) ABSTRACT

Disclosed is a gas-diffusion layer used for fuel cells, including: a porous material that includes as main ingredients conductive particles and a polymer resin, wherein said gas-diffusion layer internally possesses pores with a size from 0.01 μm to 0.05 μm, and hollows with a size from 1 μm to 200 μm. Further disclosed is a process for producing a gas-diffusion layer used for fuel cells, including: (i) kneading conductive particles, a polymer resin, a pore-forming agent, a surfactant, and a dispersion solvent; (ii) rolling the
(Continued)

mixture obtained in Step (i) to shape said mixture into a sheet; (iii) baking the sheet-shaped mixture to sublime the pore-forming agent, thereby forming hollows therein, and to remove the surfactant and the dispersion solvent; and (iv) further rolling the baked mixture to adjust a thickness of the baked mixture.

16 Claims, 9 Drawing Sheets

(51) Int. Cl.
| | | |
|---|---|---|
| *H01M 8/02* | (2016.01) | |
| *H01M 4/96* | (2006.01) | |
| *H01M 8/0243* | (2016.01) | |
| *H01M 8/10* | (2016.01) | |
| *H01M 8/0239* | (2016.01) | |
| *H01M 8/0234* | (2016.01) | |

(52) U.S. Cl.
CPC ........... *H01M 8/02* (2013.01); *H01M 8/0243* (2013.01); *H01M 8/0234* (2013.01); *H01M 8/0239* (2013.01); *H01M 8/10* (2013.01); *Y02P 70/56* (2015.11)

(58) Field of Classification Search
CPC ............. H01M 8/0243; H01M 8/0234; H01M 8/0239; H01M 2008/1095; Y02P 70/54; Y02P 70/56
USPC .......................................................... 429/480
See application file for complete search history.

(56) References Cited

U.S. PATENT DOCUMENTS

| | | | | | |
|---|---|---|---|---|---|
| 7,785,748 | B2* | 8/2010 | Zhang | .................. | H01M 8/023 |
| | | | | | 429/480 |
| 9,461,311 | B2* | 10/2016 | Lu | ....................... | H01M 4/8626 |
| 2005/0173244 | A1 | 8/2005 | Hayashi et al. | | |
| 2011/0039164 | A1* | 2/2011 | Akers | ..................... | H01M 4/86 |
| | | | | | 429/401 |
| 2011/0076592 | A1 | 3/2011 | Yamauchi et al. | | |
| 2011/0207025 | A1 | 8/2011 | Yamauchi et al. | | |
| 2011/0244358 | A1* | 10/2011 | Yamauchi | ........... | H01M 8/0234 |
| | | | | | 429/480 |
| 2012/0164553 | A1 | 6/2012 | Gemba et al. | | |
| 2014/0272659 | A1* | 9/2014 | Lu | ..................... | H01M 8/04291 |
| | | | | | 429/450 |
| 2016/0322646 | A1 | 11/2016 | Kajiwara et al. | | |
| 2017/0179498 | A1* | 6/2017 | Shoji | ..................... | B29C 59/026 |

FOREIGN PATENT DOCUMENTS

| | | |
|---|---|---|
| JP | 2005-267902 | 9/2005 |
| JP | 2006294559 A * | 10/2006 |
| JP | 2007-141783 | 6/2007 |
| JP | 2008-103164 | 5/2008 |
| JP | 2010205450 A * | 9/2010 |
| JP | 2010-251291 | 11/2010 |
| JP | 2011-243314 | 12/2011 |
| JP | 5099017 B | 12/2012 |
| JP | 2014-002923 | 1/2014 |
| JP | 5476694 B | 4/2014 |
| WO | 2010/050219 | 5/2010 |
| WO | 2011/027550 | 3/2011 |
| WO | 2015/098530 | 7/2015 |

OTHER PUBLICATIONS

Translation of Written Opinion (no date).*
International Search Report of PCT application No. PCT/JP2016/004651 dated Dec. 27, 2016.
Extended European Search Report dated Jul. 27, 2018 in related European Patent Application No. 16865905.0.

* cited by examiner 31   34

33

31  32  34

31  32  35  34

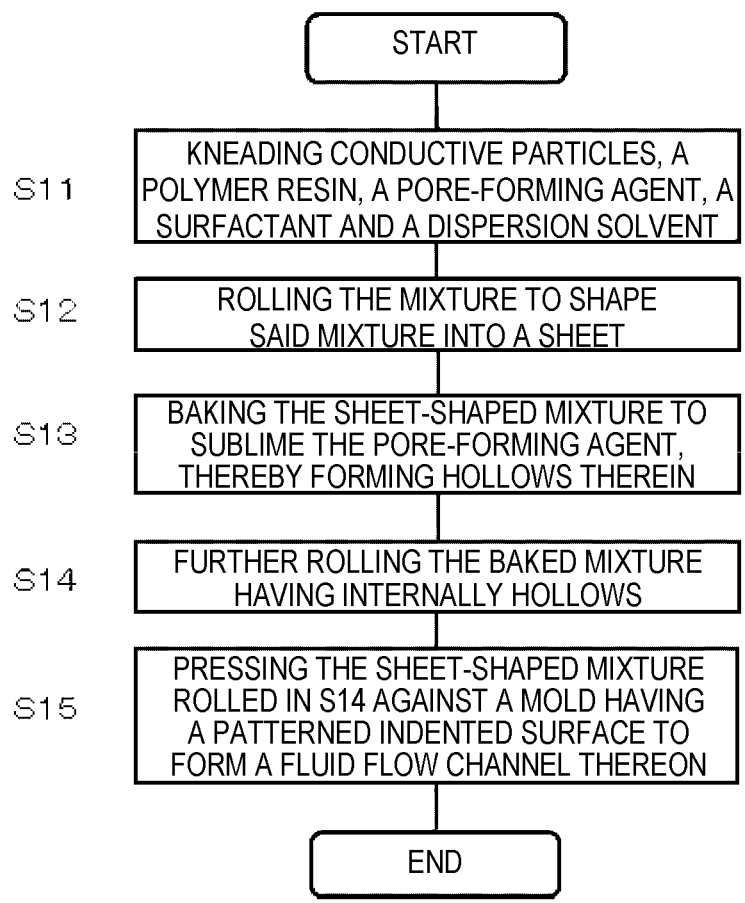

GAS DIFFUSION LAYER FOR FUEL CELL, METHOD FOR MANUFACTURING SAID LAYER, MEMBRANE-ELECTRODE ASSEMBLY, AND FUEL CELL

TECHNICAL FIELD

The technical field relates to fuel cells, particularly, membrane-electrode assemblies used for fuel cells, gas-diffusion layers provided in the membrane-electrode assemblies, and processes for producing the same.

BACKGROUND

In fuel cells, e.g., polymer electrolyte fuel cells, one side of an electrolyte membrane is exposed to a fuel gas such as hydrogen, and another side thereof is exposed to an oxygen gas.

As a result, in polymer electrolyte fuel cells, water is produced through a chemical reaction taking place in the electrolyte membrane.

Thus, polymer electrolyte fuel cells are based on electrical extraction of reaction energies produced in this way.

Cell units in polymer electrolyte fuel cells each have membrane-electrode assemblies (hereinafter, referred to as MEAs), and pairs of separators each located on both sides of MEAs.

MEAs each include: hydrogen-ion-conductive polymer electrolyte membranes; pairs of electrode layers that each hold the polymer electrolyte membranes; catalyst layers; and gas-diffusion layers. Catalyst layers contain carbon powders carrying platinum-group catalysts as main ingredients and are formed on both sides of the polymer electrolyte membranes. The gas-diffusion layers are formed on the catalyst layers and combine power-collection actions, gas permeability, and water repellency.

It is required that the gas-diffusion layers have sufficient gas permeability and gas-diffusion properties, such that the gas-diffusion layers uniformly supply gases coming from the separators to the catalyst layers.

Moreover, it is also required that the gas-diffusion layers have excellent electric conductance so as to serve as electron-conducting pathways between the gas-diffusion layers and the catalyst layers.

Therefore, electrically-conductive porous substrates such as carbon-fiber unwoven fabrics, and carbon-fiber woven fabrics have been employed for the gas-diffusion layers.

Furthermore, it is required that the gas-diffusion layers have high water repellency, so as to remove excess water produced through battery reactions in the catalyst layers from the MEA systems, thereby preventing the produced water from blocking pores of the gas-diffusion layers.

Therefore, materials obtained by subjecting electrically-conductive porous substrates to water-repellent treatments with fluorine resins have been employed for the gas-diffusion layers.

Additionally, water-repellant layers that contain as main ingredients carbon powders, and water-repellant resins such as fluorine resins, are frequently provided at sides adjacent to the catalyst layers, which are made of electrically-conductive porous substrates.

Thus, since the electrically-conductive porous substrates for gas-diffusion layers are subjected to water-repellant treatments, blockage of pores of the gas-diffusion layers by the produced water is prevented.

Additionally, since the water-repellant layers have higher water repellency than the electrically-conductive porous substrates, it becomes possible to quickly discharge the excess water produced in the catalyst layers to the outside of the MEA systems.

JP-A-2003-197202 discloses gas-diffusion layers in which water-repellant layers are formed on electrically-conductive porous substrates.

In the gas-diffusion layers, water-repellant layers that includes carbon materials (e.g., carbon black, hollow carbon fibers) and fluorine resins are formed on surfaces of carbon-fiber based substrate 'e.g., papers, woven fabrics, unwoven fabrics).

Furthermore, WO2010/050219, JP-A-2003-187809, and JP-A-2007-141783 each disclose gas-diffusion layers in which no carbon fibers are used as substrates.

The gas-diffusion layers disclosed in WO2010/050219 are formed of porous materials that include as main ingredients electrically-conductive particles, and polymer resins, and further includes smaller amounts of carbon fibers compared with the amounts of polymer resins.

The gas-diffusion layers disclosed in JP-A-2003-187809 are formed by mixing graphite, carbon black, unbaked PTFE and baked PTFE.

The gas-diffusion layers disclosed in JP-A-2007-141783 are formed of boron-modified carbon, carbon fibers, and fluorine resins.

Furthermore, the publication of Japanese patent No. 5,099,017 discloses gas-diffusion layers that are formed of porous materials. The porous materials are produced through foam molding of foamable slurries containing starting material powders of corrosion-resistant metals, foaming agents, and binders, and thus, have three-dimensional network structures in which hollows communicating with each other are present.

The publication of Japanese patent No. 5,476,694 discloses gas-diffusion layers that are made of water-repellant porous materials having recessed parts and projecting parts. The most frequently distributed diameters of hollows present in the projecting parts are larger than those of hollows present in the recessed parts in the porous materials.

JP-A-2005-267902 and JP-A-2011-243314 disclose gas-diffusion layers having pore diameters set to predetermined ranges.

In the gas-diffusion layers disclosed in JP-A-2005-267902, a diameter of pores having a high-frequency peak of pore volume is adjusted to a range from 10 μm to 30 μm.

In the gas-diffusion layers disclosed in JP-A-2011-243314, a mean pore diameter is adjusted to a range from 31 μm to 49 μm.

SUMMARY

Since water-repellent layers are provided on surfaces of carbon fiber substrates in the gas-diffusion layers according to the method disclosed in JP-A-2003-197202, such water-repellent layers become factors for increases in the electric resistance, and thus, IR loss will be caused during the power generation. Thus, the presence of water-repellent layers becomes a factor for deteriorations in the battery performance.

Furthermore, for formation of such repellent layers, many processes such as ink preparation, coating, drying, and baking are required.

Additionally, carbon fiber substrates are expensive, and therefore, reductions in costs will be difficult.

Furthermore, according to the methods disclosed in WO2010/050219, JP-A-2003-187809, and JP-A-2007-141783, carbon particles and binder resins are tightly filled in the gas-diffusion layers. Therefore, the conventional arts have problems of inferior gas permeability and water-discharging properties.

Furthermore, according to the publication of Japanese Patent No. 5099017, the starting powdery material for the gas-diffusion layer, which is made of a corrosion-resistant metal, has no gas permeability, and therefore, it would be required that the formed hollows communicate with each other.

That is, independent hollows do not contribute to development of the gas permeability and water-discharging properties at all.

Therefore, a number of hollows are required to obtain sufficient gas permeability and water-discharging properties in the gas-diffusion layer. However, hollows produced through foam molding processes have larger mean diameters (e.g., 20-600 μm).

Consequently, simultaneous development of conductivity and water-discharging properties becomes difficult in the gas-diffusion layer.

Furthermore, according to the method disclosed in the publication of Japanese Patent No. 5476694, most frequent diameters of hollows present in the recessed parts of the gas-diffusion layer are smaller, and therefore, the gas permeability and water-discharging properties of the recessed parts will be inferior.

On the other hand, according to the methods disclosed in JP-A-2005-267902 and JP-A-2011-243314, a mean diameter of pores is controlled to 10-50 μm by way of forming water-repellent layers on carbon fiber substrates in the gas-diffusion layers, in the same manner as JP-A-2003-197202.

For reference, according to the carbon particles and the binder resins in WO2010/050219, JP-A-2003-187809, and JP-A-2007-141783, a mean diameter of pores is considered 1 μm.

Thus, according to the methods disclosed in JP-A-2005-267902 and JP-A-2011-243314, the diameter of pores is larger, and therefore, the water-repellent layers cause increases in the electric resistance, and cause IR loss during power generation. That is, the presence of the water-repellent layers is a factor for deteriorations in the battery performance.

Furthermore, according to the methods disclosed in JP-A-2005-267902 and JP-A-2011-243314, many processes such as ink preparation, coating, drying, and baking are required for formation of the repellent layers.

Additionally, carbon fiber substrates are expensive, and therefore, reductions in costs will be difficult.

Therefore, an object of the disclosure is to provide gas-diffusion layers for fuel cells that combine sufficient gas permeability/water-discharging properties, and higher conductivity, without substantially using any expensive carbon fiber substrates. The disclosure makes it possible to solve the above-described problems.

That is, according to one aspect of the disclosure, provided is a gas-diffusion layer used for fuel cells, including: a porous material that includes as main ingredients conductive particles and a polymer resin, wherein said gas-diffusion layer internally possesses pores with a size from about 0.01 μm to about 0.05 μm, and hollows with a size from about 1 μm to about 200 μm.

Furthermore, according to another aspect of the disclosure, provided is a process for producing a gas-diffusion layer used for fuel cells, including: (i) kneading conductive particles, a polymer resin, a pore-forming agent, a surfactant, and a dispersion solvent; (ii) rolling the mixture obtained in Step (i) to shape said mixture into a sheet; (iii) baking the sheet-shaped mixture to sublime the pore-forming agent, thereby forming hollows therein, and to remove the surfactant and the dispersion solvent; and (iv) further rolling the baked mixture to adjust a thickness of the baked mixture.

According to the disclosure, pores with a size from about 0.01 μm to about 0.05 μm, and hollows with a size from about 1 μm to about 200 μm are formed inside porous material that includes as main ingredients conductive particles and polymer resins. As a result, the disclosure makes it possible to significantly improve the gas permeability and the water-discharging properties, thereby improving power-generation performance of fuel cells.

Additionally, since formation any water-repellent layers on expensive carbon fiber substrates is not necessarily required in the carbon materials in the disclosure, the disclosure makes it possible to reduce costs and to simplify steps for production of fuel cells.

BRIEF DESCRIPTION OF THE DRAWINGS

FIG. 15 is a diagram that describes a process for producing a gas-diffusion layer according to the second embodiment.

DESCRIPTION OF EMBODIMENTS

As described above, the disclosure provides a gas-diffusion layer used for fuel cells, including: a porous material that includes as main ingredients conductive particles and a polymer resin, wherein said gas-diffusion layer internally possesses pores with a size from about 0.01 µm to about 0.05 µm, and hollows with a size from about 1 µm to about 200 µm.

The phrase "porous material including as main ingredients conductive particles and polymer resins" refers to a porous material that does not include any substrates made of carbon fibers, and that possesses a structure supported only by the conductive particles and the polymer resins.

In cases in which the porous material is produced by using conductive particles and polymer resins, for example, surfactants and dispersion solvents are employed.

In this case, in the process of producing the porous material, the surfactants and the dispersion solvents are removed in the baking step. However, they may not sufficiently be removed, and, consequently, may remain in the porous material.

Therefore, the phrase "porous material including as main ingredients conductive particles and polymer resins" means that such remaining surfactants and dispersion solvents can be included in the porous material, as long as the porous material possesses a structure supported only by the conductive particles and the polymer resins.

Furthermore, the above phrase means that any materials (e.g., carbon fibers) other than the conductive particles, the polymer resins, the surfactants and the dispersion solvents can also be included in the porous material.

Hereinafter, embodiments of the disclosure will be described with reference to the drawings.

First Embodiment

A basic structure of a fuel cell according to the present embodiments will be described with reference to FIG. 1.

Figure 1:
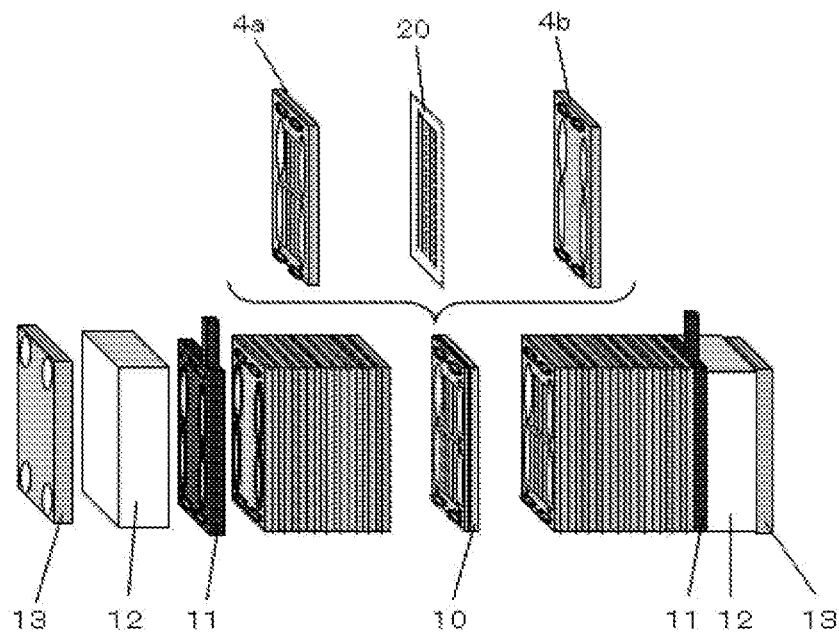
FIG. 1 is a schematic view of a stack structure found in a polymer electrolyte fuel cells according to a first embodiment or a second embodiment of the disclosure.

FIG. 1 is a schematic perspective view of a stack structure in polymer electrolyte fuel cell according to present embodiments.

In addition, the present embodiments are not limited to polymer electrolyte fuel cells, and thus, are applicable to various fuel cells.

As shown in FIG. 1, in the fuel cell, multiple battery cells 10 that serve as base units are stacked, and the stack is bolted with current-collector plates 11, insulation plates 12 and edge plates 13 at both sides with a predetermined load.

For the current-collector plates 11, gas-non-permeable conductive materials such as copper and brass are employed.

The current-collector plates 11 are provided with current-extraction terminal areas, and thus, currents are extracted therefrom during power generation.

For the insulation plates 12, insulative resins such as fluorine resins and PPS resins are employed.

For the edge plates 13, highly rigid metal materials such as steel are employed.

The edge plates 13 fasten and hold a stack of multiple battery cells 10, the current-collector plates 11, and the insulation plates 12, based on a pressure-applying unit not shown in the figures, at a predetermined load.

The battery cell 10 will now be described based on FIG. 2.

Figure 2:
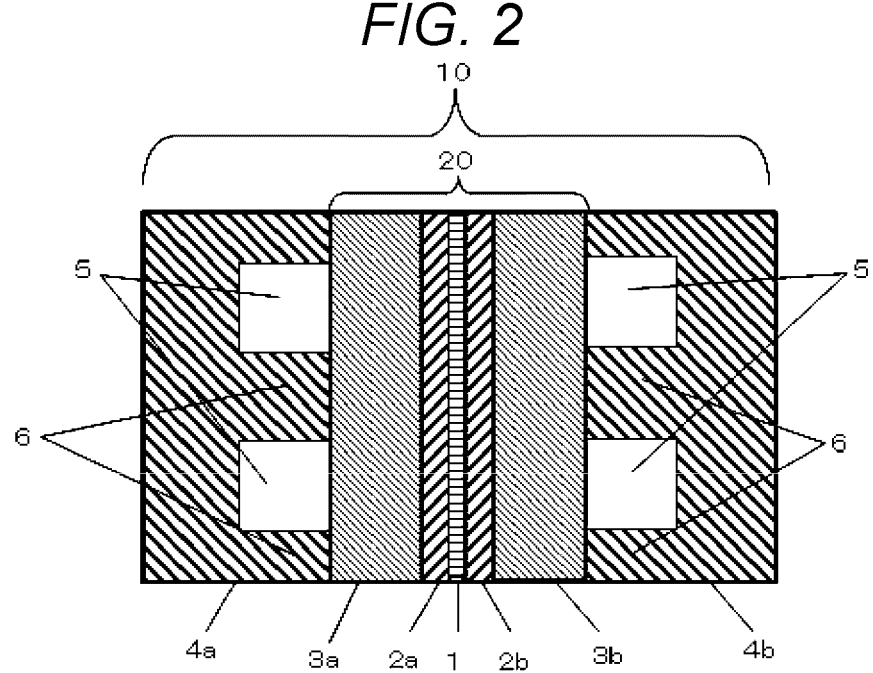
FIG. 2 is a cross-section view of a battery cell in the polymer electrolyte fuel cell according to the first embodiment.

FIG. 2 is a cross-section view of the battery cell 10.

The battery cells 10 each have a structure in which an MEA 20 is placed between an anode-side separator 4a and a cathode-side separator 4b.

In addition, both the anode-side separator 4a and the cathode-side separator 4b may be referred to as separators 4 below.

Other counterpart elements may also be referred as by omitting symbols of a and b when they are explained all at once.

In the separators 4, fluid flow channels 5 are formed. Fluid flow channels 5 for fuel gases are formed in the anode-side separator 4a, while fluid flow channels 5 for oxidant gases are formed in the cathode-side separator 4b.

For the separators 4, carbon-based materials, or metal-based materials may be employed.

The fluid flow channels 5 are formed as grooves, and peripheral areas of the fluid flow channels 5 are configured as ribs 6.

In the MEA 20, an anode catalyst layer 2a and a cathode catalyst layer 2b (both of which may be referred to as catalyst layers 2) are formed on both sides of a polymer electrolyte membrane 1 that selectively transports hydrogen ions. Furthermore, an anode-side gas-diffusion layer 3a and a cathode-side gas-diffusion layer 3b are located on the external sides.

For the polymer electrolyte membrane 1, perfluorocarbon sulfonic acid copolymers may be employed. However, materials used therefor are not particularly limited as long as they have proton conductance.

As the catalyst layers 2, layers including carbon materials carrying catalyst particles made of platinum or the like, and polymer electrolytes can be employed.

<Gas-Diffusion Layer 3>

Next, a structure of a gas-diffusion layer 3 according to an embodiment will be described with reference to FIGS. 3A and 3B.

Figure 3A:
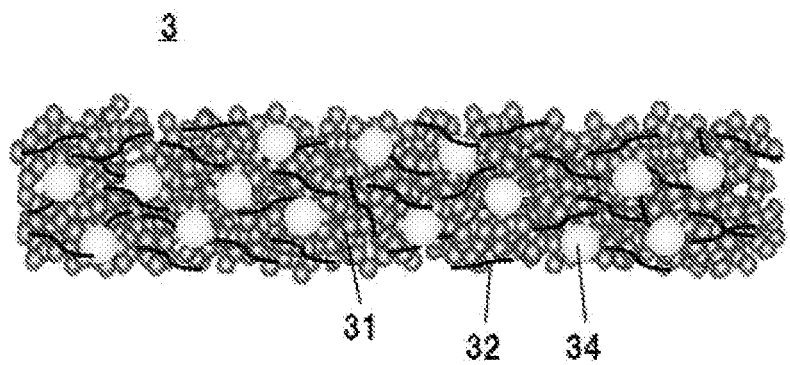
FIG. 3A is a schematic view of an internal structure of a gas-diffusion layer according to the first embodiment.
Figure 3B:
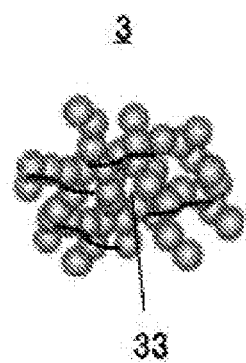
FIG. 3B is an enlarged schematic view of the internal structure of a gas-diffusion layer according to the first embodiment.

In FIGS. 3A and 3B, it appears as if the succession of conductive particles 31 are interrupted by pores 33 and hollows 34. However, it is merely observed that the succession of conductive particles 31 are interrupted at certain spots.

The same shall apply to FIGS. 5, 6, 9A, 9B, 11, 12, 13 and 14.

FIG. 3A is a view of an internal structure of the gas-diffusion layer 3.

FIG. 3B is a view of an enlarged internal structure of gas-diffusion layer 3.

The gas-diffusion layer 3 includes as main ingredients conductive particles 31 and polymer resins 32, and internally have pores 33 with a size of about 0.01 µm to about 0.05 µm, and hollows 34 of about 1 µm to about 200 µm.

As examples of materials for the conductive particles 31, carbon materials such as carbon black, graphite, and activated carbon may be used.

Among these materials, carbon black that has higher conductivity and larger pore volumes is preferably employed.

For the carbon black, acetylene black, Ketchen black, furnace black, Vulcan, etc. can be used.

Among others, a material that includes as a main ingredient acetylene black with few impurities, or acetylene black, and 5 wt % to 50 wt % of highly-conductive Ketchen black is preferably employed for the conductive particles 31.

As examples of materials for the polymer resin 32, PTFE (polytetrafluoroethylene), FEP (tetrafluoroetylene/hexafluoropropylene copolymers), PVDF (polyvinylidene difluoride), ETFE (ethylene/tetrafluoroethylene copolymers), PCTFE (polychlorotrifluoroethylene), PFA (polyfluoroethylene/perfluoroalkyl vinyl ether copolymers), etc. can be mentioned.

Among these materials, PTFE is preferably used for the polymer resins 32 since PTFE has favorable heat resistance, water repellency, and chemical resistance.

A form of PTFE provided as a starting material may be a dispersion, powder, or the like.

Among others, the form of dispersion is preferable since, needless to say, it realizes excellent dispersibility.

The polymer resins 32 serves as binders that bind conductive particles 31 together.

Furthermore, since the polymer resins 32 have water repellency, they also play a role on preventing water from accumulating in the pores 33 and the hollows 34 inside the gas-diffusion layer 3, thus impeding the gas permeability.

The gas-diffusion layer 3 internally have pores 33 with a size of about 0.01 µm to about 0.05 µm and hollows 34 with a size of about 1 µm to about 200 µm.

<Pores 33>

The pores 33 with a size of about 0.01 µm to about 0.05 µm, are formed as gaps among the conductive particles 31.

In cases in which the conductive particles 31 are made of carbon black, the pores 33 are formed as gaps among the primary particles of carbon black.

Since a mean diameter of the primary particles of carbon black is about 0.02 µm to about 0.04 µm, the pores formed through filling of such carbon black will have a particles size from about 0.01 µm to about 0.05 µm.

If pores having a size smaller than about 0.01 µm are formed, it may be difficult for water molecules to pass therethrough, and, consequently, the gas-diffusion layer 3 may have inferior water discharging properties. Consequently, the gas-diffusion layer 3 may exhibit inferior water-discharging properties, and this may result in deteriorated battery performance due to the occurrence of flooding.

In contrast, if the size of pores become larger than about 0.05 µm, distances between the primary particles of carbon black will be larger. As a result, this may result in reductions in conductivity and the battery performance.

The pores 33 are distributed throughout the entire internal body of gas-diffusion layer 3, and serve as pathways for diffusion of gases, or discharge of water/water vapor.

In addition, a diameter of the pores can be measured based on the mercury intrusion technique.

<Hollows 34>

The hollows 34 with a size from about 1 µm to about 200 µm are scattered inside the gas-diffusion layer 3.

The hollows 34 may be independent pores, or continuous pores.

Since the hollows 34 are scattered all over the inside of the gas-diffusion layer 3, gas-diffusion effects, and water/vapor-discharge effects can exponentially be improved, even in cases where effects brought about only by the pores 33 with a size from about 0.01 µm to about 0.05 µm are insufficient.

If a size of the hollows 34 becomes smaller than about 1 µm, the distance across the pores 33 that the gases, water, and water vapors would have to travel would become longer. Therefore, sufficient gas-diffusion properties and water/water vapor-discharge properties may not be obtained.

On the other hand, if the size of hollows 34 is larger than about 200 µm, conductance and mechanical strength may be significantly deteriorated due to the presence of such large hollows 34. Consequently, this may cause deteriorations in the battery performance, and damage to the gas-diffusion layer.

A proportion of areas of hollows 34 with a size from about 1 µm to about 200 µm is from about 0.5% to about 5% with respect to an area of the cross-section of the gas-diffusion layer.

If the proportion of areas of hollows 34 is smaller than about 0.5%, almost no improvements on gas-diffusion properties/water-discharging properties may be observed.

If the proportion of the areas of hollows 34 becomes larger than 5%, conductivity of the gas-diffusion layer may be deteriorated, and this may cause deterioration in the battery performance.

<Method for Calculating the Proportion of Areas of Hollows 34>

Now, one method for calculating the proportion of areas of hollows 34 with respect to the area of cross-section of the gas-diffusion layer 3 will be described.

The cross-section gas-diffusion layer 3 is cut to form a cross-section thereof, and then, the cross-section is polished. Then, an SEM or microscope photograph of the polished cross-section is taken.

Hollows with a size from about 1 µm to about 200 µm are extracted from the cross-section photograph by use of an image processing software, and thus, the proportion of areas of hollows 34 can be calculated as a ratio of the areas of the hollows to the total area of the cross-section.

Figure 4A:
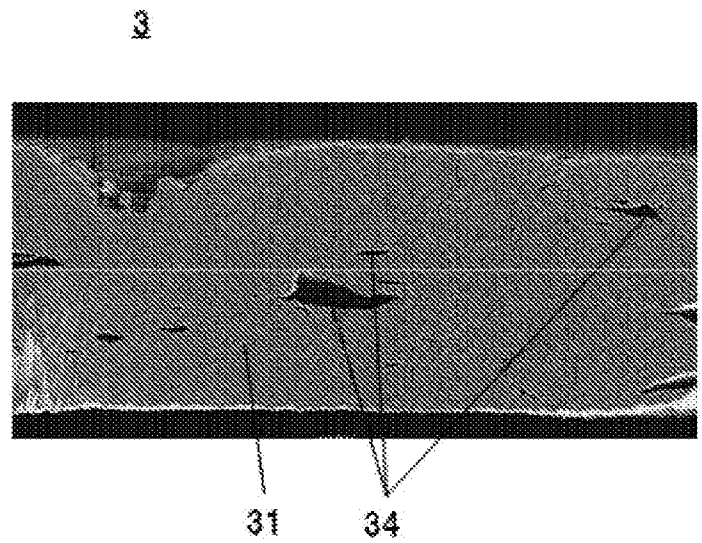
FIG. 4A is an SEM photograph of a cross-section of the gas-diffusion layer according to the first embodiment.
Figure 4B:
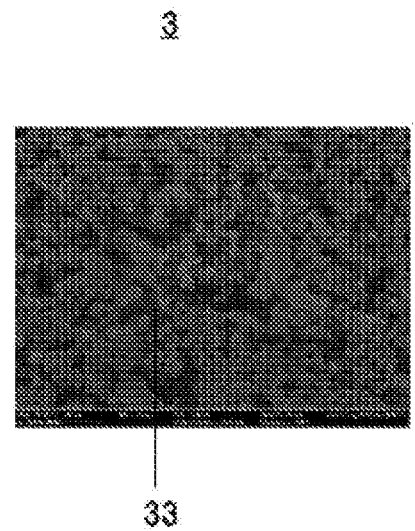
FIG. 4B is an SEM photograph of a cross-section of the gas-diffusion layer according to the first embodiment.

FIG. 4A is an SEM photograph of the cross-section of the gas-diffusion layer 3. FIG. 4B is an enlarged photograph of the cross-section of the gas-diffusion layer 3.

With the photographs, conductive particles 31, pores 33 with a size from about 0.01 µm to about 0.05 µm, hollows 34 with a size from about 1 µm to 200 µm can be confirmed.

In addition, polymer resins 32 are observed as fine fibers, and it would be realized that any damage to the polymer resins 32 are not caused by electron beams generated during the SEM observation.

<Variations for the Gas-Diffusion Layer 3>

Figure 5:
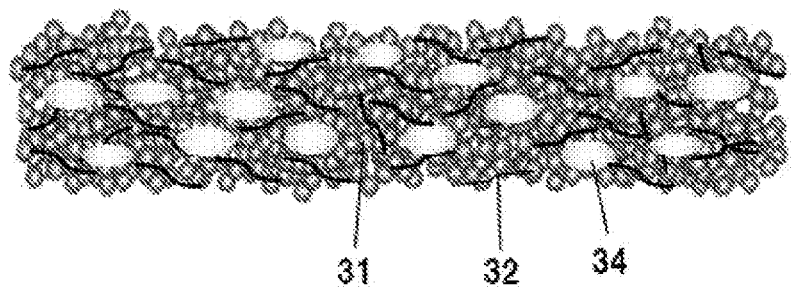
FIG. 5 is a schematic view of one variation of an internal structure according to the first embodiment.
Figure 6:
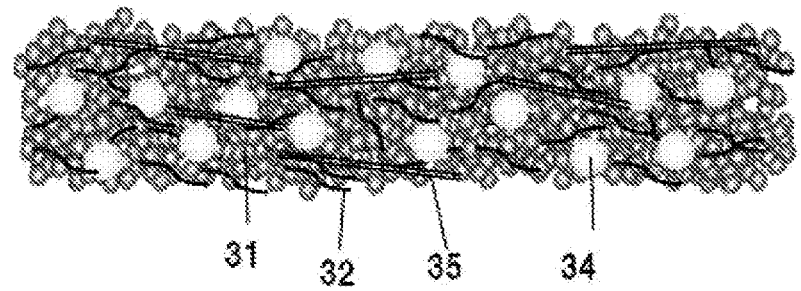
FIG. 6 is a schematic view of another variation of an internal structure according to the first embodiment.

FIGS. 5 and 6 are diagrams that shows variations of the internal structure of the gas-diffusion layer 3 shown in FIG. 3.

FIG. 5 is a diagram that shows one possible internal structure of the gas-diffusion layer 3.

In FIG. 5, a diameter of the hollows 34 in the planar direction of the gas-diffusion layer 3 (i.e., a direction parallel to the polymer electrolyte membrane 1) is larger than a diameter thereof in the thickness direction.

When the diameter of the hollows 34 in the planar direction is larger, in particular, diffusion of the gases from the fluid flow channels 5 to the ribs 6 will be increased. Furthermore, water produced under the ribs 6 will move to the planar direction through the hollows 34, and thus, will quickly be discharged into the gas flow channels 5.

In that case, the diameter in the planar direction is preferably 1.5 times larger than the diameter in the thickness direction.

This is because the thickness of the gas-diffusion layer 3 may typically be from about 100 µm to about 400 µm, the width of the rib 6 may typically be from about 300 µm to about 1000 µm. As a result, the gas-diffusion pathway or the water-discharging pathway in the planar direction are longer than the gas-diffusion pathway or the water-discharging pathway in the thickness direction.

Therefore, when the diameter in the planar direction is preferably 1.5 times larger than the diameter in the thickness direction, the gas diffusion and the water discharge toward the planar direction will be promoted, and thus, the battery performance will be improved.

In addition, the planar direction corresponds to the rolling direction of the gas-diffusion layer 3.

During production of the gas-diffusion layer 3, a paste is rolled as mentioned below.

That is, the direction, to which the paste is extended by rolls, corresponds to the planar direction.

FIG. 6 is a view that shows another variation of an internal structure of the gas-diffusion layer 3.

In this variation, a weight of carbon fibers 35 that cannot serve as a substrate, is added to the gas-diffusion layer 3.

In that case, the "weight that cannot serve as a substrate" refers to a weight that is incapable of forming an independent shape serving as a substrate (i.e., incapable of serving as a substrate by itself).

The weight of the carbon fibers 35 may be about 20 wt % or less, and the weight of the polymer resin 32 may be from about 10 wt % to about 20 wt %. According to these weight proportions, it becomes possible to reduce the resistance in the gas-diffusion layer 3.

For the carbon fibers 35, vapor-phase grown carbon fibers, milled fibers, cut fibers, chopped fibers, etc. can be employed.

Among these materials, vapor-phase grown carbon fibers are preferable since they have smaller fiber diameters, and thus, will not impede binder effects of the polymer resins 32.

<Porosity of Gas-Diffusion Layer 3>

A porosity of the gas-diffusion layer 3 is preferably from about 60% to about 80%.

If the porosity is smaller than 60%, gas-diffusion pathways, and water-discharging pathways may be reduced, and thus, the battery performance may be deteriorated due to the occurrence of flooding.

On the other hand, in order to realize a porosity larger than about 80%, it may be required that there is a reduction in the amount of polymer resin 32, and therefore, the mechanical strength of the gas-diffusion layer 3 may be reduced.

Now, a method for calculating the porosity of the gas-diffusion layer 3 will be described.

At first, based on real densities and compositional proportions of materials that constitute the gas-diffusion layer 3, an apparent real density of the gas-diffusion layer 3 is calculated.

Then, a weight, a thickness, and horizontal and vertical dimensions of the produced gas-diffusion layer 3 are measured, and a density of the produced gas-diffusion layer 3 is calculated.

Then, the calculated density and apparent real density of the gas-diffusion layer 3 are assigned to an equation as follows.

Porosity=(Density of the gas-diffusion layer 3)/(Apparent real density)×100.

In this way, the porosity is calculated.

<Gas Permeability of Gas-Diffusion Layer 3>

With regard to the gas permeability of the gas-diffusion layer 3, a Gurley value of the gas-diffusion layer 3 is preferably 100 seconds or less.

If the Gurley value is larger than 100 seconds, the gas-permeability, and the water-discharging properties may be insufficient, and thus, the battery performance may be deteriorated.

Now the Gurley value will be described.

With regard to the mechanism of the test, air is compressed by the weight of an internal cylinder floating in an oil inside an external cylinder, and thus, the air penetrates through a test piece.

Since the internal cylinder descends gradually, the period of time required for 100 mL of air to penetrate through a test piece is measured as a Gurley value.

In that case, the area of a test piece that the air is caused to penetrate through is adjusted to 6.42 cm$^2$.

<Tensile Break Strength of the Gas-Diffusion Layer 3>

The tensile break strength of the gas-diffusion layer 3 is preferably about 0.05 N/mm$^2$ or higher.

If the tensile break strength is smaller than about 0.05 N/mm$^2$, it may become difficult to arrange the gas-diffusion layer 3 as a self-supported film.

The tensile break strength of the porous material is preferably about 0.05 N/mm$^2$ or higher, and the gas-diffusion layer 3 is arranged as a self-supported film that is supported only by the conductive particles and the polymer resins, without using carbon fibers as a substrate.

<Thickness of the Gas-Diffusion Layer 3>

The thickness of the gas-diffusion layer 3 is preferably from about 100 μm to about 400 μm.

If the thickness is smaller than about 100 μm, the strength may become lower, and it may become difficult to arrange the gas-diffusion layer 3 as a self-supported film.

Furthermore, if the thickness is larger than about 400 μm, the resistance may become excessively high, and thus, the battery performance may be deteriorated.

<Process for Producing a Gas-Diffusion Layer 3>

Figure 7:
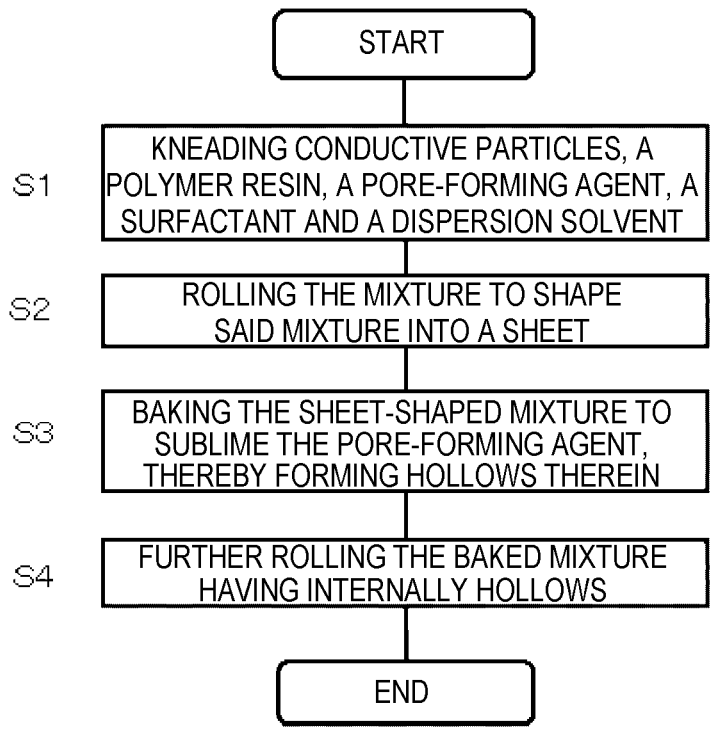
FIG. 7 is a diagram that describes a process for producing a gas-diffusion layer according to the first embodiment.

Next, a process for producing a gas-diffusion layer 3 according to first embodiment of the disclosure will be described based on FIG. 7.

In Step 1, conductive particles, polymer resins, a pore-forming agent, a surfactant, and a dispersion solvent are kneaded.

More specifically, the carbon materials serving as conductive particles, the pore-forming agent, the surfactant, and the dispersion are stirred and kneaded.

After the above materials are uniformly dispersed, a polymer resin material is added thereto, and is uniformly dispersed therein to obtain a mixture thereof.

In Step 2, by way of rolling the mixture, it is formed into a sheet.

In Step 3, by baking a sheet of the mixture, the surfactant, and the dispersion solvent are removed from the mixture, and also, the pore-forming agent is sublimed. Thus, hollows are formed inside the sheet-shaped mixture.

In Step 4, the sheet-shaped mixture, from which the surfactant and the dispersion solvent have been removed, is again rolled by a roll press machine so as to adjust the thickness.

Thus, the gas-diffusion layer 3 according to the first embodiment can be produced.

(Step 1)

In Step 1, materials that are sublimed at a temperature equal to or lower than the melting point of the polymer resins (e.g., fumaric acid) can be employed for the pore-forming agent.

The particle diameter of the above materials (e.g., fumaric acid) may be from about from 1 μm to about 300 μm, preferably from about 10 μm to about 100 μm.

Fumaric acid is a white crystalline powder. Although fumaric acid has carboxylic groups, it has poor water solubility.

Additionally, when it is heated to about 280° C. to about 300° C., it will be sublimed.

In Step 1, 5 wt % to 30 wt % of fumaric acid is added to the conductive particles and the polymer resins to prepare a mixture. In Step 2, the mixture is shaped into a sheet. In Step 3, the sheet-shaped mixture is baked at 300° C. or higher.

Through the above baking step, fumaric acid is sublimed from the gas-diffusion layer 3 so as to form hollows inside the gas-diffusion layer 3.

Then, in Step 4, the thickness of the sheet-shaped mixture is adjusted to obtain a gas-diffusion layer 3.

In Step 1, a planetary mixer, a hybrid mixer, a kneader, a roll mill, etc. can be employed to knead the materials.

In the kneading step, the shearing force applied to the polymer resins influences on the molding formability and the mechanical strength of the produced sheet.

In general, the higher the shearing force is, the more polymer resins are formed into fibers, and the binding properties of the conductive particles are increased. Thus, the mechanical strength of the gas-diffusion layer 3 will be improved.

However, if the shearing force is excessively high, the conversion of the polymer resins into fibers is excessively progressed, and this may result in formation of hard ball-shaped products. Consequently, it may be impossible to mold the material into a sheet by rolling.

Therefore, it is preferable that the conductive particles, the pore-forming agent, the surfactant, and the dispersion solvent are kneaded, and the materials are dispersed in the solvent in advance, and then, the polymer resins are finally added thereto, the operation of kneading is completed when the polymer resins are uniformly dispersed.

(Step 2)

In Step 2, a roll press machine can be employed for forming the sheet.

With regard to conditions for the roll press step, the mixture may be rolled at one or more times at about 0.001 ton/cm$^2$ to about 4 ton/cm$^2$ so as to shape the polymer resins into fibers, and thus, a gas-diffusion layer 3 having sufficient mechanical strength can be obtained.

(Step 3)

In Step 3, an IR furnace (infrared furnace), or a hot-air drying furnace can be used for baking the sheet.

For the baking temperature, a temperature that is higher than a sublimation temperature of the pore-forming agent and that is lower than a melting point of the polymer resins may be adopted.

If the baking temperature is lower than the sublimation temperature of the pore-forming agent, then, the pore-forming agent may remain inside the gas-diffusion layer 3, and thus, the gas-diffusion layer 3 may not have improved gas permeability and water-discharging properties.

Furthermore, if the baking temperature is higher than the melting point of the polymer resins, the polymer resins may melt, and thus, the gas-diffusion layer 3 may have lower mechanical strength.

For example, in cases where fumaric acid is used for the pore-forming agent and PTEF is used for the polymer resins, the baking temperature is preferably from about 310° C. to about 340° C.

(Step 4)

When the sheet of kneaded material is again rolled by a roll press machine in Step 4, diameters of the hollows in the planar direction of the gas-diffusion layer 3 can be made larger than diameters of the hollows in the thickness direction by way of increasing the pressing force.

Furthermore, by rolling the sheet of the mixture with a roll press machine in Step 4, the sheet of the mixture is stretched to the rolling direction (MD direction). As a result, the diameters of the hollows in the rolling direction (MD direction) can be made larger than the diameters of the hollows in the direction vertical (TD direction).

In Step 4, a roll press machine can be employed for the rerolling process.

With regard to conditions for the roll pressing process, the sheet may be rolled at one or more times at about 0.01 ton/cm$^2$ to about 4 ton/cm$^2$ to adjust the thickness and the porosity of the gas-diffusion layer 3.

The disclosure is not limited to the above-illustrated embodiments. The disclosure can be carried out in every other embodiment.

Second Embodiment

A fuel cell according to the second embodiment of the disclosure will be described.

Gas-diffusion layers 3 in this embodiment are different from those adopted in the first embodiment.

The gas-diffusion layer 3 according to the second embodiment differs from the gas-diffusion layer 3 according to the first embodiment in that fluid flow channels 5 are formed on one surface of the gas-diffusion layer 3.

Any other features are the same as those described in the first embodiment. Therefore, overlapping descriptions will be omitted, and the main differences will be mentioned.

A basic structure of the fuel cell according to the second embodiment is the same as the basic structure of the fuel cell in the first embodiment. Therefore, descriptions thereon will be omitted.

Matters not mentioned in this embodiment are the same as those described in the first embodiment.

Next, a structure of a battery cell 10 according to the second embodiment will be described in detail.

Figure 8:
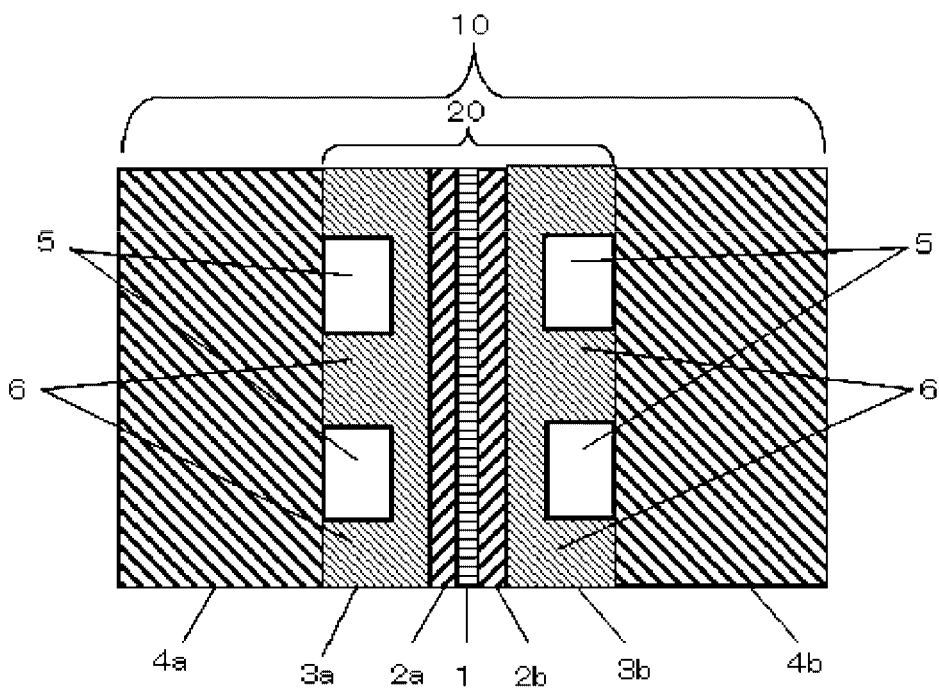
FIG. 8 is a cross-section view of a battery cell in the polymer electrolyte fuel cell according to the second embodiment.

FIG. 8 is a cross-section view of the battery cell 10.

The battery cell 10 is configured in such a manner that MEAs 20 are placed between anode-side separators 4a and cathode-side separators 4b, in the same manner as the first embodiment.

A difference between the second and first embodiments is that, in the second embodiment, fluid flow channels 5 are formed not on the separators 4 but on the gas-diffusion layers 3.

As shown in FIG. 8, surfaces of separators 4 brought into contact with gas-diffusion layers 3 are flat on the surfaces of separators 4, and any fluid flow channels 5 are formed. However, fluid flow channels 5 are formed on surfaces of the gas-diffusion layer 3 brought into contact with the separators 4.

The depth of fluid flow channel 5 is preferably from about 40% to about 80% of the thickness of the gas-diffusion layer 3, and the width of the fluid flow channel 5 is preferably from about 0.1 mm to about 1.0 mm, and a ratio of the widths of the rib and the channel is preferably from about 1:0.8 to about 1:1.2.

Next, the gas-diffusion layer 3 according to the second embodiment will be described with reference to FIGS. 9A and 9B.

Figure 9A:
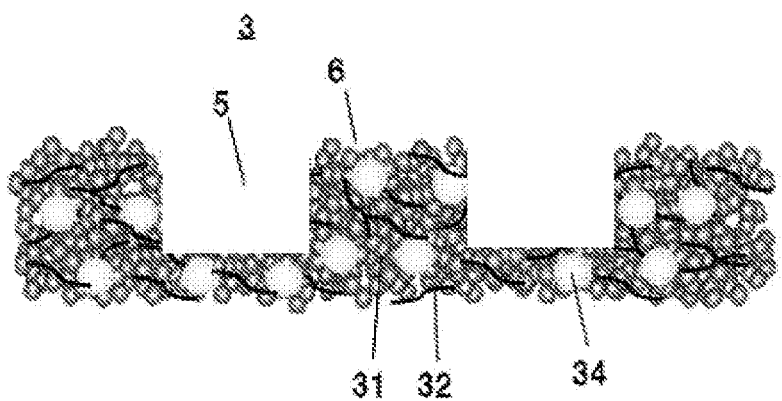
FIG. 9A is a schematic view of an internal structure of a gas-diffusion layer according to the second embodiment.

FIG. 9A is a schematic view of an internal structure of the gas-diffusion layer 3 according to the second embodiment.

Figure 9B:
FIG. 9B is an enlarged schematic view of an internal structure of a gas-diffusion layer according to the second embodiment.

FIG. 9B is an enlarged schematic view of an internal structure of the gas-diffusion layer 3 according to the second embodiment.

As shown the internal structure in FIGS. 9A and 9B, the gas-diffusion layer 3 is formed of a porous material that includes as main ingredients conductive particles 31 and polymer resins 32, and fluid flow channels 5 are formed on one surface of the gas-diffusion layer 3.

Furthermore, the gas-diffusion layer 3 internally possesses pores 33 with a size from about 0.01 μm to about 0.05 μm and hollows 34 with a size from about 1 μm to about 200 μm.

The ribs 6 present on surfaces of the gas-diffusion layers 3 where fluid flow channels 5 are present are brought into contact with surfaces of separators 4, and thus, they are electrically connected with each other.

In addition, surfaces of the gas-diffusion layers 3 opposite to the surfaces where the fluid flow channels 5 are present are brought into contact with the catalyst layers.

Fuel gases and oxidant gases flow through the fluid flow channel 5, and further pass through the pores 33 and the hollows 34 in the gas-diffusion layers 3. Then, the fuel gases and oxidant gases are diffused into the catalyst layers.

Figure 10A:
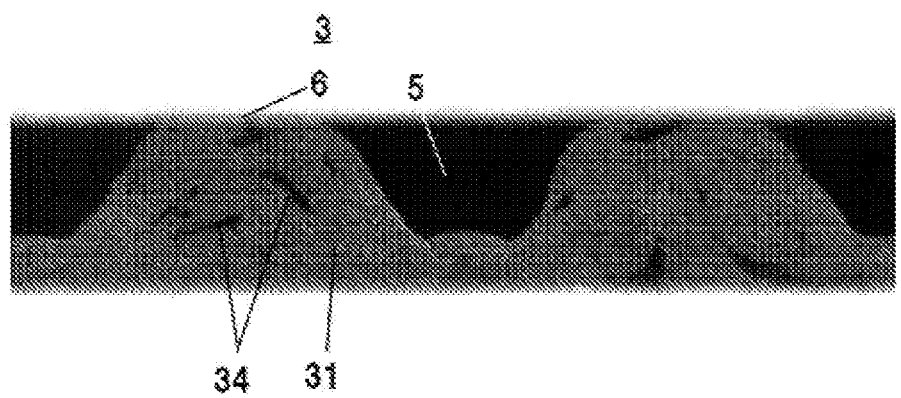
FIG. 10A is a photograph of a cross-section of a gas-diffusion layer according to the second embodiment.
Figure 10B:
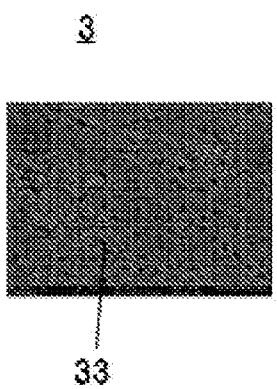
FIG. 10B is a photograph of a cross-section of a gas-diffusion layer according to the second embodiment.

FIG. 10A is a photograph of a cross-section of the gas-diffusion layer 3, and FIG. 10B is an enlarged photograph of the cross-section of the gas-diffusion layer 3.

The gas-diffusion layers 3 have conductive particles 31, pores 33 with a size from about 0.01 μm to about 0.05 μm, hollows 34 with a size from about 1 μm to about 200 μm, fluid flow channels 5, and ribs 6 on the surfaces where the fluid flow channels 5 are present.

In addition, polymer resins 32 are observed as fine fibers, and it would be realized that any damage to the polymer resins 32 are not caused by electron beams generated during the SEM observation.

<Variations>

FIGS. 11-14 each refer to variations of the gas-diffusion layers 3 depicted in FIG. 9. FIGS. 11-14 are views of the internal structures of the gas-diffusion layers 3.

Figure 11:
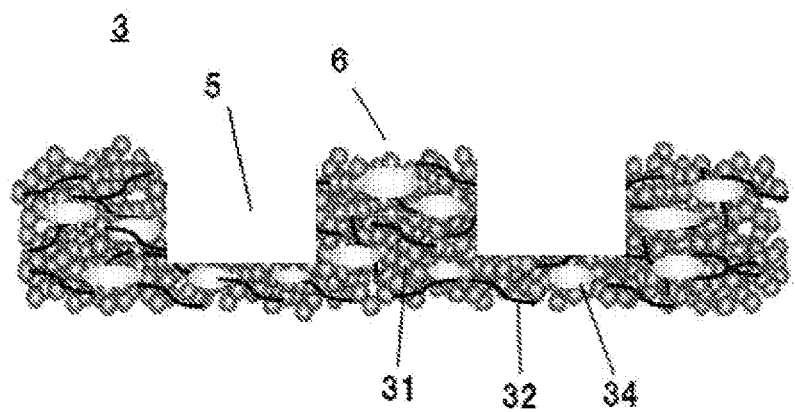
FIG. 11 is a schematic view of one variation of an internal structure according to the second embodiment.

In FIG. 11, diameters of hollows 34 in the planar direction of the gas-diffusion layer 3 in FIG. 9 are larger than diameters of the hollows 34 in the thickness direction of the gas-diffusion layer 3.

Particularly, when diameters of the hollows in the planar direction are larger, diffusion of gases through fluid flow channels 5 toward the ribs 6 will be improved. Furthermore, in that case, water produced under the ribs will also move to the planar direction through the pores, and thus, will quickly be discharged to the gas flow channels.

In addition, the planar direction corresponds to the rolling direction of the gas-diffusion layer 3.

During production of the gas-diffusion layer 3, a paste is rolled as mentioned below.

That is, the direction, to which the paste is extended by rolls, corresponds to the planar direction.

Figure 12:
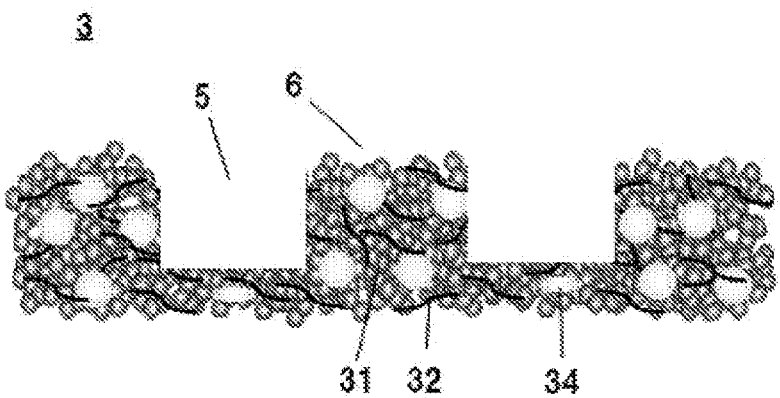
FIG. 12 is a schematic view of another variation of an internal structure according to the second embodiment.

In FIG. 12, proportions of the pores 34 present in the ribs 6 are larger than proportions of the pores 34 present in bottoms of the fluid flow channels 5.

Fuel gases or oxidant gases flowing through fluid flow channels 5 pass through the pores present in the ribs 6 and will be diffused into the catalysts in the ribs 6, to which gases are difficult to diffuse into.

Meanwhile, since a few hollows are present in the bottoms of the fluid flow channels 5, an increase of resistance caused by the hollows 34 can be suppressed.

Figure 13:
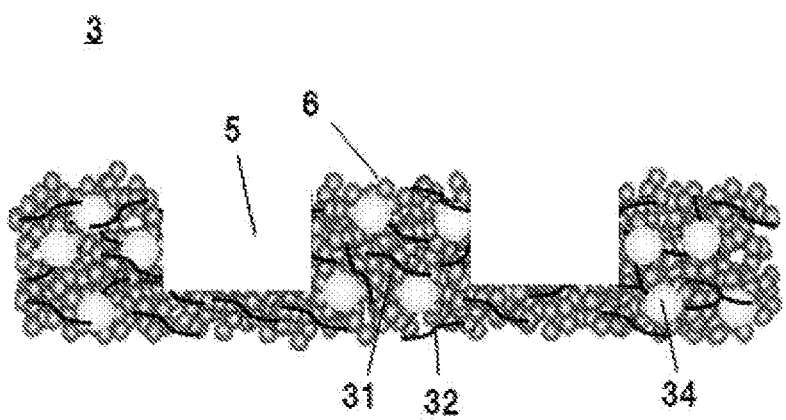
FIG. 13 is a schematic view of still another variation of an internal structure according to the second embodiment.

In FIG. 13, inside the gas-diffusion layer 3, hollows 34 are present only in the ribs 6, and hollows 34 are not present in the bottoms of the fluid flow channels 5.

Accordingly, any conductivity in the bottoms of the fluid flow 5 will not be sacrificed, and improvements on gas diffusion properties of the ribs 6, and high conductivity in the bottoms of the fluid flow channels 5 can be combined.

Figure 14:
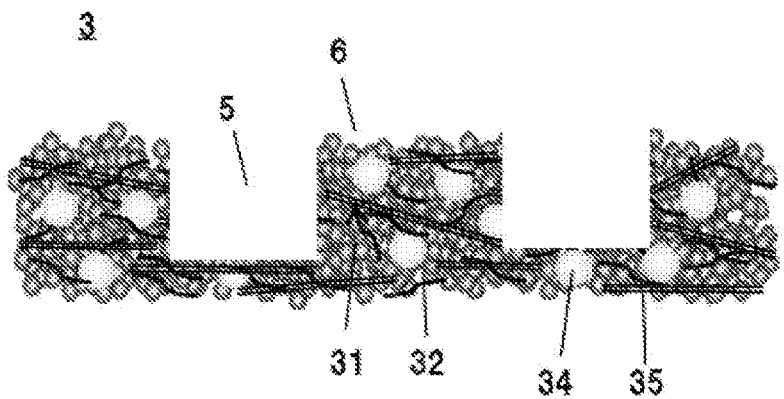
FIG. 14 is a schematic view of yet another variation of an internal structure according to the second embodiment.

In FIG. 14, a weight of carbon fibers 35 that cannot serve as a substrate, is added to the gas-diffusion layer 3.

The weight of the carbon fibers 35 may be about 20 wt % or less, and the weight of the polymer resin 32 may be from about 10 wt % to about 20 wt %. According to these weight proportions, it becomes possible to reduce the resistance in the gas-diffusion layers 3a and 3b.

<Production Process>

Next, a process for producing a gas-diffusion layer 3 according to the second embodiment will be described.

Matters not mentioned in this embodiment are the same as those described for the production process in the first embodiment.

A flowchart for the production of gas-diffusion layer 3 is shown in FIG. 15.

In Step 15, the gas-diffusion layer 3 prepared based on the production process described in the first embodiment is pressed with a mold having patterned indented surfaces, and thus, fluid flow channels 5 are formed thereon.

Thus, the gas-diffusion layer 3 according to the second embodiment of the disclosure can be produced.

Step 15 is not limited to the above technique.

For example, the gas-diffusion layer 3 prepared based on the production process described in the first embodiment may be caused to pass through rolls having patterned indented surfaces to form the fluid flow channels 5 on the gas-diffusion layer 3.

Additionally, by pressing the gas-diffusion layer 3 against the mold having patterned indented surfaces in Step 15, a certain number of hollows may be crushed and eliminated in parts corresponding to the projecting parts of the mold, such that proportions of hollows in bottoms of fluid flow channels 5 is made larger than proportions of hollows in the ribs 6.

Furthermore, in Step 15, by further increasing the pressing force with the mold, all of the hollows may be crushed and eliminated in parts corresponding to the projecting parts of the mold. Thus, a gas-diffusion layer 3 that possesses hollows only in the ribs 6 of the fluid flow channels 5 can be produced.

EXAMPLES

Hereinafter, working examples of the disclosure will be described.

Materials described below were employed in the working examples.

[Conductive Particles]

Acetylene black (DENKA BLACK manufactured by DENKA COMPANY LIMITED; powdery product);

Ketchen black (ECP300 manufactured by LION CORPORATION); and artificial graphite (an SGP grade with a mean particle size of 30 μm manufactured by SEC CARBON, LIMITED).

[Carbon Fiber]

VGCF (VGCF-H manufactured by SHOWA DENKO K.K.)

[Fluorine Resin]

A PTFE dispersion (manufactured by DAIKIN INDUSTRIES, LTD.)

[Pore-Forming Agent]

Fumaric acid (manufactured by NIPPON SHOKUBAI CO., LTD.; particle diameter: 50-200 μm)

[Gas Permeability Tester]

Gurley-type densometer (manufactured by Toyo Seiki Seisaku-sho, Ltd.)

Examples 1-6

With regard to compositional ratios of materials used for production of gas-diffusion layers 3, composition ratios of acetylene black, Ketchen black, artificial graphite, VGCF, PTFE, and fumaric acid (pore-forming agent) shown in Table 1 were adopted.

Based on the production process described in the above first embodiment, gas-diffusion layers 3 having a thickness of 200 μm and the above-mentioned compositions were prepared.

Porosities, mean pore diameters, numbers of hollows with sizes from 1 μm to 200 μm, ratios of areas of the hollows to the total areas, gas permeabilities (Gurley values), and resistance values in the thickness direction of the prepared gas-diffusion layers 3 were measured.

The results are shown in Table 1.

Comparative Examples 1-6

In Comparative Examples 1-4, gas-diffusion layers 3 each having a thickness of 200 μm were prepared in the same manner as Examples 1-4, respectively, except that fumaric acid was not included.

Additionally, in Comparative Examples 5 and 6, gas-diffusion layers 3 each having a thickness of 200 μm were prepared in the same manner as Examples 5 and 6, respectively, except that the amount of the pore-forming agent was decreased or increased.

Porosities, mean pore diameters, numbers of hollows with sizes from 1 μm to 200 μm, ratios of areas of the hollows to the total areas, gas permeabilities (Gurley values), and resistance values in the thickness direction of the prepared gas-diffusion layers 3 were measured.

The results are shown in Table 1.

Preferable ranges for porosities, mean pore diameters, numbers of hollows with sizes, ratios of areas of the hollows to the total areas, gas permeabilities (Gurley values), and resistance values in the thickness direction, as well as reasons therefor will be described below.

When all of the above properties exhibited by test samples fell within preferable ranges, the samples were considered acceptable. In contrast, when any of the properties deviated from the preferable ranges, the samples were considered inferior.

[Porosity]

A preferable range of the porosity is from about 60% to about 80%.

The reason will be described below.

If the porosity is lower than about 60%, the numbers of gas diffusion/water-discharge pathways may be decreased, and thus, the battery performance may be deteriorated due to the occurrence of flooding.

On the other hand, in order to cause the porosity to be larger than about 80%, it is required that there is a reduction in the amount of the polymer resin 32, and therefore, the resulting gas-diffusion layer 3 may have lower mechanical strength.

[Mean Pore Diameter]

A preferable range for the mean pore diameter is from about 0.01 μm to about 0.05 μm.

The reason is as follows.

If the sizes of hollows 34 are smaller than about 1 μm, distances that the gases, water, and water vapors travel across the pores 33 would become longer. As a result, sufficient gas diffusion properties, and water/water-vapor discharging properties cannot be obtained.

On the other hand, if the sizes of hollows 34 are larger than about 200 μm, the conductivity and the mechanical strength would significantly be lowered due to the presence of such larger hollows 34, and thus, deteriorations in battery performance, and breakage of the gas-diffusion layer 3 would be caused.

[Number of Hollows]

A preferable range for the number of the hollows is from about 10 to about 80 per area of 0.1 mm$^2$.

The reason is as follows.

If the number of the hollows is smaller than about 10 per area of 0.1 mm$^2$, sufficient gas permeability cannot be obtained.

On the other hand, if the number of the hollows is larger than about 80 per area of 0.1 mm$^2$, the conductivity is deteriorated, and thus, the battery performance is lowered.

[Ratio of Areas of Hollows to the Total Area]

The ratio of areas of hollows to the total area is preferably equal to or larger than about 0.5%.

The reason is as follows.

If the ratio of areas of hollows to the total area is smaller than about 0.5%, sufficient gas permeability may not be obtained.

[Gurley Number]

The Gurley number is preferably about 100 sec. with respect to 100 mL.

The reason is as follows.

If the Gurley number is larger than about 100 seconds, the gas permeability and the water-discharging properties may become insufficient, and thus, the battery performance may be deteriorated.

[Resistance in the Thickness Direction]

The resistance in the thickness direction is preferably smaller than about 15 mΩ·cm$^2$.

The reason is as follows.

If the resistance in the thickness direction is larger than about 15 mΩ·cm$^2$, the resistance overvoltage becomes high, and thus, the battery performance may be deteriorated.

TABLE 1

| | Compositions of gas-diffusion layers | | | | | Amounts of pore-forming agents (%) | Porosities (%) | Mean diameters of pores (μm) | Number of hollows (numbers/ 0.1 mm$^2$) | Ratios of areas of hollow to total areas (%) | Gurley values (sec./ 100 mL) | Values of resistance in thickness directions (mΩ· cm$^2$) | Acceptance |
|---|---|---|---|---|---|---|---|---|---|---|---|---|---|
| | AB (%) | KB (%) | Artificial Graphite (%) | VGCF (%) | PTFE (%) | | | | | | | | |
| Example 1 | 75 | 0 | 10 | 0 | 15 | 20 | 70 | 0.039 | 42 | 2.5 | 27 | 11.5 | Acceptable |
| Example 2 | 65 | 0 | 10 | 10 | 15 | 20 | 70 | 0.038 | 46 | 2.8 | 25 | 8.5 | Acceptable |
| Example 3 | 75 | 0 | 0 | 10 | 15 | 20 | 75 | 0.037 | 43 | 2.6 | 30 | 13.0 | Acceptable |
| Example 4 | 50 | 15 | 0 | 15 | 20 | 20 | 75 | 0.030 | 46 | 2.8 | 21 | 9.0 | Acceptable |
| Example 5 | 75 | 0 | 10 | 0 | 15 | 8 | 69 | 0.039 | 13 | 0.5 | 98 | 10.5 | Acceptable |
| Example 6 | 75 | 0 | 10 | 0 | 15 | 30 | 74 | 0.039 | 65 | 5.0 | 4 | 14.0 | Acceptable |
| Comparative | 75 | 0 | 10 | 0 | 15 | 0 | 68 | 0.038 | 2 | 0.1 | 330 | 10.0 | Unaccept- |

TABLE 1-continued

|  | Compositions of gas-diffusion layers | | | | | Amounts of pore-forming agents (%) | Po- rosi- ties (%) | Mean diam- eters of pores (μm) | Num- ber of hollows (numbers/ 0.1 mm²) | Ratios of areas of hollow to total areas (%) | Gurley values (sec./ 100 mL) | Values of resistance in thickness directions (mΩ·cm²) | Acceptance |
|---|---|---|---|---|---|---|---|---|---|---|---|---|---|
|  | AB (%) | KB (%) | Artifical Graphite (%) | VGCF (%) | PTFE (%) | | | | | | | | |
| Example 1 |  |  |  |  |  |  |  |  |  |  |  |  | able |
| Comparative Example 2 | 65 | 0 | 10 | 10 | 15 | 0 | 68 | 0.038 | 4 | 0.2 | 330 | 7.5 | Unaccept- able |
| Comparative Example 3 | 75 | 0 | 0 | 10 | 15 | 0 | 73 | 0.036 | 3 | 0.1 | 380 | 12.0 | Unaccept- able |
| Comparative Example 4 | 50 | 15 | 0 | 15 | 20 | 0 | 73 | 0.029 | 5 | 0.2 | 310 | 8.0 | Unaccept- able |
| Comparative Example 5 | 75 | 0 | 10 | 0 | 15 | 5 | 68 | 0.039 | 9 | 0.3 | 190 | 9.8 | Unaccept- able |
| Comparative Example 6 | 75 | 0 | 10 | 0 | 15 | 35 | 81 | 0.039 | 85 | 6.0 | 2 | 21 | Unaccept- able |

Examples 1-4

As shown in Table 1, certain number of hollows are formed inside the gas-diffusion layers 3 produced in Examples 1-4 in contrast to Comparative Examples 1-4, since pore-forming agents were included in Examples 1-4.

Consequently, values of resistance in the thickness direction are slightly higher due to influences by the presence of the hollows inside the gas-diffusion layers 3. However, Gurley values of Examples 1-4 are one digit smaller than those of Comparative Examples 1-4, and thus, it was confirmed that the gas permeability is significantly improved in Examples 1-4.

Examples 5 and 6

Based on comparison between the gas-diffusion layers 3 in Examples 5/6 and Comparative Examples 5/6, it is understood that, when an amount of pore-forming is smaller, the number of hollows and the ratio of areas of the hollows becomes smaller.

Therefore, although the resistance will be lower, the Gurley value becomes larger, and thus, it is understood that the gas permeability becomes inferior.

On the other hand, when the amount of the pore-forming agent is increased, the number of hollows and the ratio of areas of the hollows become larger.

Therefore, the Gurley value becomes smaller, and thus, it is understood that the gas permeability is improved. However, it is also understood that the resistance becomes higher.

Examples 7-11

In Examples 7-11 acetylene black, Ketchen black, artificial graphite, VGCF, PTFE, and fumaric acid (pore-forming agent) were used at compositional ratios shown in Table 2 to prepare gas-diffusion layers 3.

Based on the production process described in the second embodiment, fluid flow channels 5 having the following dimensions were formed on one side of each of the gas-diffusion layers 3. Dimensions of fluid flow channels 5:
 length=60 mm;
 width=60 mm;
 thickness=300 μm
 depth of grooves=200 μm
 groove width (width of flow channels)=400 μm; and
 width of rib:width of groove (width of flow channel)=1:1.

Ratios of areas of hollows with a size from 1 μm to 200 μm, and ratios of areas of rib 6 under the bottoms of fluid flow channels 5 in the produced gas-diffusion layers 3 were measured.

Then, mixtures of platinum-supported carbon and electrolyte solutions were coated onto both sides of polymer electrolyte membranes (Nafion 112 manufactured by Du Pont) based on the spray method, and the coated mixtures were dried.

Furthermore, the gas-diffusion layers 3 having fluid flow channels 5 were stacked on the external sides of the above materials as mentioned above, such that flat surfaces of the gas-diffusion layers 2 came into contact with the catalyst layers. The resulting products were subject to hot pressing in conditions as follows: a surface pressure of 1 kgf/cm², and a temperature of 120° C.

Thus, MEAs were prepared.

Planar carbon plates 0.3 mm thick (TOKAI CARBON CO., LTD.) and gold-plated steel-made current-collector plate 11 were placed at outer sides of the MEAs, and then, the resulting stacks were fastened at a fastening force of 5 kgf/cm², thereby preparing the fuel cells.

The prepared fuel cells were subjected to a power-generation test at an increased pressure 70 kPa under conditions as follows. A temperature of cell was 80° C.; a hydrogen gas having a dew point of 70° C. and a fuel-gas stoichiometric ratio of 1.5 (a ratio of an amount of the supplied fuel gas to a theoretical amount of the fuel gas consumed in the battery reaction) was supplied to the anode sides; and the air having a dew point of 70° C. and an oxidant-gas stoichiometric ratio of 1.8 was supplied to the cathode sides.

In the I-V characteristic test, maximum values were recorded as output densities.

Additionally, to evaluate gas diffusion properties, an overvoltage separation was carried out at a current density of 1.7 A/cm², and thus, diffusion overvoltages and resistance overvoltages were calculated.

The results are shown in Table 2.

Comparative Examples 7-10

In Comparative Examples 7-10, gas-diffusion layers 3 were prepared in the same manner as Examples 7-10, respectively, except that fumaric acid was not included. The prepared gas-diffusion layers 3 each had a thickness of 300

μm. Additionally, the prepared gas-diffusion layers 3 each had fluid flow channels 5 with dimensions as follows. The groove depth was 200 μm, the groove width (width of flow channel) was 400 μm, and the rib width:groove width=1:1.

Fuel cells were prepared and evaluated in the same manner as Examples 4-8.

The results are shown in Table 2.

Preferable ranges for ratios of areas of the hollows to the total areas, ratios of areas of the hollows in the ribs 6 to the total areas, ratios of areas of the hollows in the bottoms of the flow channels to the total areas, output densities, diffusion overvoltages, and resistance overvoltages, as well as reasons therefor will be described below. When all of the above properties exhibited by test samples fell within preferable ranges, the samples were considered acceptable. In contrast, when any of the properties deviated from the preferable ranges, the samples were considered inferior.

[Ratio of Areas the Hollows to the Total Area]

The ratio of areas of the hollows to the total area is equal to or larger than about 0.5%.

[Power Density]

The power density is preferably equal to or larger than about 0.9 W/cm$^2$.

The reason is as follows.

If the power density is smaller than about 0.9 W/cm$^2$, power-generation efficiencies in the fuel cells may be deteriorated, and also, a large amount of heat may be produced, and therefore, high cooling capacity may be required.

[Diffusion Overvoltage]

The diffusion overvoltage is preferably equal to or lower than about 0.110 V (current density of about 1.7 A/cm$^2$).

The reason is as follows.

If the diffusion overvoltage is larger than 0.110 V, power-generation efficiencies in the fuel cells may be deteriorated.

[Resistance Overvoltage]

The resistance overvoltage is preferably equal to or lower than about 0.15 V (current density of about 1.7 A/cm$^2$).

The reason is as follows.

If the resistance overvoltage is larger than 0.15 V, power-generation efficiencies in the fuel cells may be deteriorated.

TABLE 2

| | Compositions of gas-diffusion layers | | | | | Amounts of pore-forming agents (%) | Ratios of areas of hollows (%) | Ratios of areas of hollows in ribs (%) | Ratios of areas of hollows in bottoms of flow channels (%) | Output densities (W/cm$^2$) | Diffusion overvoltage (V) | Resistance overvoltage (V) | Acceptance |
|---|---|---|---|---|---|---|---|---|---|---|---|---|---|
| | AB (%) | KB (%) | Artificial Graphite (%) | VGCF (%) | PTFE (%) | | | | | | | | |
| Example 7 | 75 | 0 | 10 | 0 | 15 | 20 | 1.6 | 2.8 | 0.9 | 0.90 | 0.102 | 0.13 | Acceptable |
| Example 8 | 65 | 0 | 10 | 10 | 15 | 20 | 1.9 | 3.1 | 1.1 | 0.92 | 0.095 | 0.12 | Acceptable |
| Example 9 | 75 | 0 | 0 | 10 | 15 | 20 | 1.6 | 2.7 | 0.9 | 0.95 | 0.098 | 0.13 | Acceptable |
| Example 10 | 50 | 15 | 0 | 15 | 20 | 20 | 2.0 | 3.2 | 1.2 | 1.00 | 0.088 | 0.11 | Acceptable |
| Example 11 | 75 | 0 | 10 | 0 | 15 | 15 | 1.2 | 2.0 | 0 | 0.92 | 0.098 | 0.11 | Acceptable |
| Comparative Example 7 | 75 | 0 | 10 | 0 | 15 | 0 | 0.05 | 0.1 | 0 | 0.78 | 0.113 | 0.13 | Unacceptable |
| Comparative Example 8 | 65 | 0 | 10 | 10 | 15 | 0 | 0.14 | 0.2 | 0 | 0.80 | 0.115 | 0.12 | Unacceptable |
| Comparative Example 9 | 75 | 0 | 0 | 10 | 15 | 0 | 0.08 | 0.1 | 0 | 0.82 | 0.118 | 0.13 | Unacceptable |
| Comparative Example 10 | 50 | 15 | 0 | 15 | 20 | 0 | 0.14 | 0.2 | 0 | 0.85 | 0.111 | 0.11 | Unacceptable |

The reason is as follows.

If the ratio of areas of the hollows to the total area is smaller than about 0.5%, sufficient gas permeability may not be obtained.

[Ratio of Areas of Hollows in the Rib 6]

The ratio of areas of the hollows in the rib 6 is preferably equal to or larger than about 0.5%.

The reason is as follows.

If the ratio of areas of the hollows in the rib 6 is smaller than about 0.5%, sufficient gas permeability may not be obtained.

[Ratio of Areas of Hollows in Bottoms of Flow Channels]

The ratio of areas of hollows in bottoms of flow channels is preferably 5.0% or smaller.

The reason is as follows.

The thickness of the gas-diffusion layer 3 in the bottoms of the flow channels is smaller than the thickness of the ribs 6, and therefore, higher conductivity would be required in the bottoms of the flow channels, rather than gas-diffusion properties.

Therefore, if the ratio of areas of hollows in bottoms of flow channels is larger than 5.0%, the conductivity would become inferior, and thus, battery performance may be deteriorated.

The above results indicate that battery cells using the gas-diffusion layers 3 prepared in Examples 7-11 exhibit higher output densities, compared with fuel cells using the gas-diffusion layers 3 prepared in Comparative Examples 7-10.

With regard to the results of the overvoltage separation, the diffusion overvoltages are lower. Thus, it was revealed gas diffusion to the catalyst layers, and water discharge properties were improved due to the presence of hollows inside the gas-diffusion layer 3, in particular, the presence of hollows in ribs 6.

Furthermore, with the gas-diffusion layer 3 prepared in Example 11, since any hollows were not present in the bottoms of the flow channels, increases in the resistance can be suppressed in the bottoms of the flow channel.

As a result, the resistance overvoltage can be reduced during the power generation, and the output density can be improved.

As described above, it was revealed that improvements on gas-diffusion properties and water permeability, reductions in the diffusion overvoltage, and improvements on the output density are achieved by way of forming hollows inside gas-diffusion layer 3 having fluid flow channels 5.

Furthermore, it was revealed that, even if there are any hollows in the bottoms of flow channels, the diffusion overvoltage is reduced, and the output density is improved when the ribs 6 have hollows.

Overall, the first and second embodiment can be combined.

Gas-diffusion layers for fuel cells according to the disclosure make it possible to realize improvements in power-generation performance of fuel cells, and reductions in costs. Therefore, the disclosure can be employed for the purposes of household cogeneration system, vehicle fuel cells, fuel cells for mobile devices, backup fuel cells, and the like.

What is claimed is:

1. A gas-diffusion layer used for fuel cells, the gas-diffusion layer comprising:
   a porous material that includes as main ingredients conductive particles and a polymer resin, wherein the gas-diffusion layer internally possesses pores with a size from 0.01 μm to 0.05 μm, and hollows with a size from about 1 μm to about 200 μm,
   wherein a fluid flow channel is formed on one side of the gas-diffusion layer,
   wherein a proportion of the hollows present in ribs forming the fluid flow channel is larger than a proportion of the hollows present in a bottom of the fluid flow channel, and
   the distribution of the pores is the same at the bottom and at the ribs.

2. The gas-diffusion layer of claim 1, wherein a ratio of areas of the hollows in a cross-section of the gas-diffusion layer is from 0.5% to 5%.

3. The gas-diffusion layer of claim 1, wherein a diameter of the hollows in a planar direction of the gas-diffusion layer is larger than a diameter of the hollows in a thickness direction of the gas-diffusion layer.

4. The gas-diffusion layer of claim 1, wherein the porous material further comprises a weight of carbon fibers smaller than a weight of the conductive particles.

5. The gas-diffusion layer of claim 1, wherein the porous material comprises 0-20 wt % of carbon fibers, and 10-20 wt % of the polymer resin.

6. The gas-diffusion layer of claim 1, wherein a porosity of the porous material is 60-80%.

7. The gas-diffusion layer of claim 1, wherein a gas permeability of the porous material is 100 seconds or smaller in terms of a Gurley value.

8. The gas-diffusion layer of claim 1, wherein a tensile break strength of the porous material is 0.05 N/mm$^2$, the porous material does not include carbon fibers serving as a substrate, and the porous material is a self-supported film that is supported only by the conductive particles and the polymer resin.

9. The gas-diffusion layer of claim 1, wherein a thickness of the porous material is 100-400 μm.

10. A gas-diffusion layer, used for fuel cells, the gas-diffusion layer comprising:
    a porous material that includes as main ingredients conductive particles and a polymer resin, wherein the gas-diffusion layer internally possesses pores with a size from 0.01 μm to 0.05 μm, and hollows with a size from about 1 μm to about 200 μm,
    wherein a fluid flow channel is formed on one side of the gas-diffusion layer,
    wherein the hollows are present only in ribs forming the fluid flow channel, and
    wherein the distribution of the pores is the same at a bottom of the fluid flow channel and at the ribs.

11. A membrane-electrode assembly, comprising the gas-diffusion layer of claim 1.

12. A fuel cell, comprising the gas-diffusion layer of claim 1.

13. A method for producing a gas-diffusion layer used for fuel cells, the method comprising:
    (i) kneading conductive particles, a polymer resin, a pore-forming agent, a surfactant, and a dispersion solvent into a mixture;
    (ii) rolling the mixture obtained in Step (i) to shape the mixture into a sheet;
    (iii) baking the sheet-shaped mixture to sublime the pore-forming agent, thereby forming hollows therein, and to remove the surfactant and the dispersion solvent;
    (iv) further rolling the baked mixture to adjust a thickness of the baked mixture; and
    (v) pressing the sheet-shaped mixture rolled in Step (iv) against a mold having a patterned indented surface to form a fluid flow channel thereon,
    wherein, in Step (v), the hollows present in a part of the sheet-shaped mixture corresponding to a projecting part of the mold are crushed by the projecting part of the mold, such that a proportion of the hollows present in ribs forming the fluid flow channel is larger than a proportion of the hollows present in a bottom of the fluid flow channel, and
    wherein the distribution of pores is the same at the bottom and at the ribs.

14. The method of claim 13, wherein a diameter of the hollows in a planar direction in the sheet-shaped mixture obtained in Step (iv) is larger than a diameter of the hollows in a thickness direction in the sheet-shaped mixture.

15. The method of claim 13, wherein a diameter of the hollows in a rolling direction in the sheet-shaped mixture obtained in Step (iv) is larger than a diameter of the hollows in a vertical direction to the rolling direction in the sheet-shaped mixture.

16. A method for producing a gas-diffusion layer used for fuel cells, the method comprising:
    (i) kneading conductive particles, a polymer resin, a pore-forming agent, a surfactant, and a dispersion solvent into a mixture;
    (ii) rolling the mixture obtained in Step (i) to shape the mixture into a sheet;
    (iii) baking the sheet-shaped mixture to sublime the pore-forming agent, thereby forming hollows therein, and to remove the surfactant and the dispersion solvent;
    (iv) further rolling the baked mixture to adjust a thickness of the baked mixture; and
    (v) pressing the sheet-shaped mixture rolled in Step (iv) against a mold having a patterned indented surface to form a fluid flow channel thereon,
    wherein, in Step (v), the hollows present in a part of the sheet-shaped mixture corresponding to a projecting part of the mold are crushed by the projecting part of the mold, such that there are no hollows in a bottom of the fluid flow channel, and the hollows are present only in ribs forming the fluid flow channel, and
    wherein the distribution of pores is the same at the bottom and at the ribs.

\* \* \* \* \*